(12) United States Patent
Sakane et al.

(10) Patent No.: US 11,097,956 B2
(45) Date of Patent: Aug. 24, 2021

(54) SURFACE-MODIFIED IRON-BASED OXIDE MAGNETIC PARTICLE POWDER

(71) Applicant: DOWA ELECTRONICS MATERIALS CO., LTD., Tokyo (JP)

(72) Inventors: Kenji Sakane, Tokyo (JP); Tetsuya Kawahito, Tokyo (JP)

(73) Assignee: DOWA ELECTRONICS MATERIALS CO., LTD., Tokyo (JP)

( * ) Notice: Subject to any disclaimer, the term of this patent is extended or adjusted under 35 U.S.C. 154(b) by 791 days.

(21) Appl. No.: 15/552,283

(22) PCT Filed: Mar. 11, 2016

(86) PCT No.: PCT/JP2016/057878
§ 371 (c)(1),
(2) Date: Aug. 20, 2017

(87) PCT Pub. No.: WO2016/148092
PCT Pub. Date: Sep. 22, 2016

(65) Prior Publication Data
US 2018/0033528 A1   Feb. 1, 2018

(30) Foreign Application Priority Data
Mar. 13, 2015 (JP) .............................. JP2015-051498

(51) Int. Cl.
| | | |
|---|---|---|
| H01F 1/11 | (2006.01) |
| H01F 1/147 | (2006.01) |
| C01G 49/06 | (2006.01) |
| G11B 5/706 | (2006.01) |
| G11B 5/712 | (2006.01) |
| G11B 5/714 | (2006.01) |
| C01F 17/34 | (2020.01) |
| G11B 5/84 | (2006.01) |
| C01F 7/34 | (2006.01) |
| C01G 51/00 | (2006.01) |

(52) U.S. Cl.
CPC ................ *C01G 49/06* (2013.01); *C01F 7/34* (2013.01); *C01F 17/34* (2020.01); *C01G 51/40* (2013.01); *G11B 5/70642* (2013.01); *G11B 5/712* (2013.01); *G11B 5/714* (2013.01); *G11B 5/84* (2013.01); *H01F 1/11* (2013.01); *H01F 1/14733* (2013.01); *C01P 2002/52* (2013.01); *C01P 2004/64* (2013.01); *C01P 2004/84* (2013.01); *C01P 2006/11* (2013.01); *C01P 2006/12* (2013.01); *C01P 2006/42* (2013.01); *G11B 5/70615* (2013.01); *G11B 5/70621* (2013.01)

(58) Field of Classification Search
CPC .... H01F 1/11; H01F 1/14725; H01F 1/14733; C01G 49/06; C01G 49/02; C01G 51/40; G11B 5/70642; C01P 2004/64; C01P 2004/84; C01P 2004/80; C01P 2006/42; C01P 2006/11
USPC ...... 252/62.58, 62.56, 62.57, 62.59; 428/812
See application file for complete search history.

(56) References Cited

U.S. PATENT DOCUMENTS 5,763,046 A * 6/1998 Ejiri ........................ G11B 5/70
428/141
6,207,280 B1 * 3/2001 Atarashi ................... B22F 1/02
428/403

FOREIGN PATENT DOCUMENTS

| | | | |
|---|---|---|---|
| JP | 2008-063199 | 3/2008 | |
| JP | 2008-063200 | 3/2008 | |
| JP | 2008063199 A | * 3/2008 | |
| JP | 2008-174405 | 7/2008 | |
| JP | 2008/149785 | 12/2008 | |
| JP | 2014-216034 | 11/2014 | |
| WO | 2007/114455 | 10/2007 | |
| WO | 2008/029861 | 3/2008 | |
| WO | 2012/101752 | 8/2012 | |
| WO | 2014/148502 | 9/2014 | |
| WO | WO-2014189165 A1 | * 11/2014 | ............. C09D 11/50 |

OTHER PUBLICATIONS

Machine translation of JP-2008063199-A, 23 pages. (Year: 2008).*

* cited by examiner

*Primary Examiner* — Matthew E. Hoban
*Assistant Examiner* — Lynne Edmondson
(74) *Attorney, Agent, or Firm* — Clark & Brody LP

(57) ABSTRACT

A surface-modified iron-based oxide magnetic particle powder has good solid-liquid separation property in the production process, has good dispersibility in a coating material for forming a coating-type magnetic recording medium, has good orientation property, and has a small elution amount of a water-soluble alkali metal, and to provide a method for producing the surface-modified iron-based oxide magnetic particle powder. The surface-modified iron-based oxide magnetic particle powder can be obtained by neutralizing a solution containing dissolved therein a trivalent iron ion and an ion of the metal, by which the part of Fe sites is to be substituted, with an alkali aqueous solution, so as to provide a precursor, coating a silicon oxide on the precursor, heating the precursor to provide e-type iron-based oxide magnetic powder, and adhering a hydroxide or a hydrous oxide of one kind or two kinds of Al and Y thereto.

3 Claims, No Drawings

SURFACE-MODIFIED IRON-BASED OXIDE MAGNETIC PARTICLE POWDER

TECHNICAL FIELD

The present invention relates to a surface-modified iron-based oxide magnetic particle powder that is suitable for a high density magnetic recording medium, a radio wave absorber, and the like, and particularly to particle powder having an average particle diameter of the particles in nanometer order, and a method for producing the same.

BACKGROUND ART

While $\varepsilon\text{-}Fe_2O_3$ is an extremely rare phase among iron oxides, particles thereof having a nanometer order size show a great coercive force (Hc) of approximately 20 kOe (1.59× $10^6$ A/m) at room temperature, and thus a production method for synthesizing $\varepsilon\text{-}Fe_2O_3$ as a single phase has been investigated (PTL 1). In the case where $\varepsilon\text{-}Fe_2O_3$ is used in a magnetic recording medium, there is no material in the current situation for a magnetic head having a high-level saturation magnetic flux density corresponding thereto, and thus the adjustment of the coercive force is performed by substituting a part of Fe sites of $\varepsilon\text{-}Fe_2O_3$ by a trivalent metal, such as Al, Ga, and In, and the relationship between the coercive force and the radio wave absorption characteristics is also investigated (PTL 2).

In the field of magnetic recording, development of a magnetic recording medium having a high carrier to noise ratio (C/N ratio) of the reproduced signal level and the particulate noise has been performed, and for increasing the recording density, the magnetic particles constituting the magnetic recording layer are demanded to be refined. However, the refinement of the magnetic particles generally tends to cause deterioration of the environmental stability and the thermal stability thereof, which raises concerns about the deterioration of the magnetic characteristics of the magnetic particles under the use or storage environment, and accordingly, various partially substituted materials of $\varepsilon\text{-}Fe_2O_3$ represented by the general formula $\varepsilon\text{-}A_xB_yFe_{2-x-y}O_3$ or $\varepsilon\text{-}A_xB_yC_zFe_{2-x-y-z}O_3$ (wherein A represents a divalent metal element, such as Co, Ni, Mn, and Zn; B represents a tetravalent metal element, such as Ti; and C represents a trivalent metal element, such as Ga and Al) that have a reduced particle size and a variable coercive force and are excellent in environmental stability and thermal stability, by substituting a part of Fe sites of $\varepsilon\text{-}Fe_2O_3$ by another metal that is excellent in heat resistance have been developed (PTL 3).

$\varepsilon\text{-}Fe_2O_3$ is not a thermodynamically stable phase, and therefore the production thereof requires a special method. PTLs 1 to 3 shown above describe such a production method of $\varepsilon\text{-}Fe_2O_3$ that fine crystals of iron oxyhydroxide formed by a liquid phase method are used as a precursor, and the precursor is coated with silica by a sol-gel method and then subjected to a heat treatment, and as the liquid phase method, a reverse micelle method using an organic solvent as the reaction medium, and a method using only an aqueous solution as the reaction medium are described respectively.

In a magnetic material including a magnetic recording medium or the like constituted by a packing structure of magnetic particles, an orientation treatment is generally often performed in the production process to align the easy magnetization axes of the magnetic particles in a direction, for the purpose of particularly significantly enhancing the magnetic characteristics with respect to a magnetic field in a certain direction. Examples of the representative orientation treatment include magnetic field orientation. The magnetic field orientation is such a treatment that particles of magnetic powder are kneaded with a binder, such as a resin, to form a packing structure in a prescribed shape, and a magnetic field in one direction is applied to the packing structure while the binder still has fluidity, so as to align the easy magnetization axes of the magnetic particles in the direction of the applied magnetic field. By curing the binder after completing the orientation treatment, the particles constituting the packing structure are bound in such a state that the easy magnetization axes thereof are aligned in the certain direction. PTL 4 describes a magnetic material providing powder particles having good dispersibility in a liquid or a polymer base material, by containing a suitable amount of a Si oxide on the surface of the particles. PTL 5 describes a magnetic material containing 90% by number or more of magnetic particles that are spherical particles having an aspect ratio of 3 or less aligned in one direction.

CITATION LIST

Patent Literatures

PTL 1: JP-A-2008-174405
PTL 2: WO 2008/029861
PTL 3: WO 2008/149785
PTL 4: JP-A-2008-063200
PTL 5: JP-A-2008-063199

SUMMARY OF INVENTION

Technical Problem

The $\varepsilon\text{-}Fe_2O_3$ or the $\varepsilon$-type iron-based oxide obtained by substituting a part of Fe produced by the ordinary methods described in PTLs 1 to 5 has excellent magnetic characteristics, but cannot be said to provide sufficient solid-liquid separation property of the resulting iron-based oxide in a wet production process. Furthermore, it has been found that in the case where the materials are used in a coating-type high recording density magnetic recording medium, the materials are insufficient in dispersibility and orientation property, and the capability of the magnetic tape cannot be sufficiently exhibited.

The solid-liquid separation property of the iron-based oxide becomes insufficient since the iron-based oxide is difficult to be aggregated due to the good dispersibility thereof in a medium used in production of an iron-based oxide obtained by the ordinary process, and thus is difficult to be recovered by a measure that is generally industrially used, such as filtration. Accordingly, for producing a coating-type recording medium with high capability, such magnetic powder is demanded that has good solid-liquid separation property in the production process, or in other words, has suitable aggregation property in the medium used in the production process.

In the field of a coating-type magnetic recording medium, from the standpoint of a medium suitable for a recording system, the medium is demanded to have a suitable coercive force (2,000 to 4,500 Oe, 159 to 358 kA/m) and a large squareness ratio (SQx) in the magnetic field orientation direction (which is referred to as the x direction) as the tape characteristics. The squareness ratio (SQx=Br/Bs) is a ratio of the residual magnetic flux density Br of the tape to the saturated magnetic flux density Bs of the tape on applying the magnetic field in the magnetic field orientation direction, and is a value used as an index of the orientation property. A large value of SQx means enhancement of the output, and for producing a coating-type recording medium with high capability, such magnetic powder is demanded that has good dispersibility and orientation property providing large SQx.

It is considered that the orientation property of the ε-Fe$_2$O$_3$ or the ε-type iron-based oxide obtained by substituting apart of Fe becomes insufficient in the coated film since the dispersibility of the oxide particles is insufficient in a coating material for forming the coated film. The iron-based oxide is necessarily subjected, in the production process thereof, to a heat treatment after coating iron oxyhydroxide as a precursor with a silanol derivative as a hydrolysate of a silane derivative. The heat treatment provides iron-based oxide magnetic particle powder coated with a silicon oxide (silica) formed through dehydration of the silanol derivative. In the case where the iron-based oxide magnetic particle powder is kneaded in a coating material, the silicon oxide coating is removed before use. This is because the silicon oxide is a non-magnetic material, and the presence thereof in a large amount decreases the magnetization. The most part of the silicon oxide is removed by the removing step, but there is the silicon oxide that remains without removal even in a small amount on the surface of the magnetic particle powder. It has been found that the silicon oxide remaining acts to adhere and aggregate the particles of the magnetic powder when the magnetic powder is finally dried, and deteriorates the dispersibility of the magnetic particle powder in the coating material, which may be a factor deteriorating the orientation property of the tape.

The iron-based oxide magnetic particle powder produced by a wet process contains a water-soluble alkali metal even in a slight amount as an impurity that is unavoidably incorporated in the production process. While the form of the alkali metal contained is unclear, it is considered that there are a case where the alkali metal is contained inside the iron-based oxide magnetic particle powder and a case where the alkali metal derived from the raw material solution is adhered to the surface of the iron-based oxide magnetic particle powder. The water-soluble alkali metal forms a fatty acid salt of metal through reaction with a fatty acid in the coated film, which provides concerns that the friction coefficient is increased thereby in a long term storage at a high temperature and a high humidity, and therefore there is a demand of an iron-based oxide magnetic particle powder that has a small content of the water-soluble alkali metal as the unavoidable impurity.

Accordingly, technical problems to be solved by the invention are to provide a surface-modified iron-based oxide magnetic particle powder that has good solid-liquid separation property in the production process, has good dispersibility in a coating material for forming a coating-type magnetic recording medium, has good orientation property, and has a small content of a water-soluble alkali metal, and to provide a method for producing the surface-modified iron-based oxide magnetic particle powder.

Solution to Problem

The present inventors have found that by adhering a non-magnetic metal hydroxide or hydrous oxide to iron-based oxide magnetic particle powder, from which a silicon oxide coating has been removed, the aggregation degree thereof in the production medium is increased to enhance the solid-liquid separation property, the tap density of the resulting surface-modified iron-based oxide magnetic particle powder is decreased to increase the distances among the iron-based oxide magnetic particles, thereby facilitating permeation of a liquid among the particles, the improvement of the dispersibility of the iron-based oxide magnetic particle in the coating material improves the orientation property, and the use of Al and Y as the metal element forming the hydroxide or hydrous oxide film facilitate the easy formation of the coated layer. It has been also found that the iron-based oxide magnetic particle powder having the hydroxide adhered thereto ultimately has a small content of the water-soluble alkali metal, and thus the invention described below has been completed.

For solving the problems, the invention provides:

surface-modified iron-based oxide magnetic particle powder containing iron-based oxide magnetic particle powder containing ε-Fe$_2$O$_3$ or ε-Fe$_2$O$_3$, a part of Fe sites of which is substituted by another metal element, having an average particle diameter measured with a transmission electron microscope of 5 nm or more and 30 nm or less, having adhered to a surface thereof a hydroxide or a hydrous oxide of a metal element S forming a precipitate of a hydroxide in an aqueous solution having pH of 7 or more and 12 or less.

The surface-modified iron-based oxide magnetic particle powder preferably has a molar ratio S/M of 0.02 or more and 0.10 or less, wherein M represents a sum of Fe and the substituting metal element contained therein.

The iron-based oxide magnetic particle powder is preferably ε-A$_x$B$_y$C$_z$Fe$_{2-x-y-z}$O$_3$ (wherein A represents at least one divalent metal element selected from Co, Ni, Mn, and Zn; B represents at least one tetravalent metal element selected from Ti and Sn; C represents at least one trivalent metal element selected from In, Ga, and Al; and 0<x, y, z<1).

The iron-based oxide magnetic particle powder preferably has a tap density of 0.30 cm$^3$ or more and 1.60 g/cm$^3$ or less.

The surface-modified iron-based oxide magnetic particle powder can be formed into a coating material for a coating-type magnetic recording medium, by kneading with an organic solvent and other additives.

A coating-type magnetic recording medium can be obtained by using a coating material containing the surface-modified iron-based oxide magnetic particle powder.

The invention also provides:

a method for producing surface-modified iron-based oxide magnetic particle powder containing iron-based oxide magnetic particle powder containing ε-Fe$_2$O$_3$ or ε-Fe$_2$O$_3$, a part of Fe sites of which is substituted by another metal element, having an average particle diameter measured with a transmission electron microscope of 5 nm or more and 30 nm or less, having adhered to a surface thereof a hydroxide or a hydrous oxide of a metal element S forming a precipitate of a hydroxide in an aqueous solution having pH of 7 or more and 12 or less, the method containing:

neutralizing a solution containing a trivalent iron ion and an ion of the metal, by which the part of Fe sites is to be substituted, dissolved in a solvent, preferably water, with an alkali aqueous solution, so as to provide a precursor containing iron oxyhydroxide or iron oxyhydroxide containing the substituting metal element;

coating a silicon oxide on the precursor;

heating the precursor coated with the silicon oxide, so as to provide an iron oxide containing the substituting metal element coated with the silicon oxide;

removing the silicon oxide coated on the iron oxide containing the substituting metal element; and dispersing the iron oxide containing the substituting metal element, from which the silicon oxide has been removed, in an aqueous solution, and adding one kind or two kinds of Al ion and Y ion as S thereto, so as to adhere a hydroxide or a hydrous oxide of one kind or two kinds of Al and Y, to the iron oxide containing the substituting metal element.

The surface-modified iron-based oxide magnetic particle powder produced in the invention may contain, as the iron-based oxide magnetic powder, to which the hydroxide or hydrous oxide is adhered, $\varepsilon\text{-}A_xB_yC_zFe_{2-x-y-z}O_3$ (wherein A represents at least one divalent metal element selected from Co, Ni, Mn, and Zn; 13 represents at least one tetravalent metal element selected from Ti and Sn; C represents at least one trivalent metal element selected from In, Ga, and Al; and 0<x, y, z<1).

The surface-modified iron-based oxide magnetic particle powder produced in the invention may have a tap density of 0.30 g/cm³ or more and 1.60 g/cm³ or less.

Advantageous Effects of Invention

According to the production method of the invention, surface-modified iron-based oxide magnetic particle powder suitable for achieving a high recording density of a coating-type magnetic recording medium can be provided that has good solid-liquid separation property in the production process, has good dispersibility in a coating material, has a small content of a water-soluble alkali metal.

DESCRIPTION OF EMBODIMENTS

Iron-Based Oxide Magnetic Particle

The production method of the invention is to produce iron-based oxide magnetic particle powder containing $\varepsilon\text{-}Fe_2O_3$, a part of Fe sites of which is substituted by another metal element, having adhered thereto a non-magnetic metal hydroxide or hydrous oxide, and encompasses a case where the iron-based oxide magnetic particle powder, to which the hydroxide or hydrous oxide is adhered, contains a heterogeneous phase that is unavoidable in production, in addition to the $\varepsilon$-type oxide.

The presence of an $\varepsilon$-structure in the partially substituted material obtained by substituting a part of Fe sites of $\varepsilon\text{-}Fe_2O_3$ by another metal element can be confirmed by using X-ray diffractometry (XRD), high energy electron diffractometry (HEED), and the like.

Examples of the partially substituted materials capable of being produced by the production method of the invention include the following:

a material represented by the general formula $\varepsilon\text{-}C_zFe_{2-z}O_3$ (wherein C represents at least one trivalent metal element selected from In, Ga, and Al);

a material represented by the general formula $\varepsilon\text{-}A_xB_y Fe_{2-x-y}O_3$ (wherein A represents at least one divalent metal element selected from Co, Ni, Mn, and Zn; and B represents at least one tetravalent metal element selected from Ti and Sn);

a material represented by the general formula $\varepsilon\text{-}A_xC_z Fe_{2-x-y}O_3$ (wherein A represents at least one divalent metal element selected from Co, Ni, Mn, and Zn; and C represents at least one trivalent metal element selected from In, Ga, and Al);

a material represented by the general formula $\varepsilon\text{-}B_yC_z Fe_{2-y-z}O_3$ (wherein B represents at least one tetravalent metal element selected from Ti and Sn; and C represents at least one trivalent metal element selected from In, Ga, and Al); and a material represented by the general formula $\varepsilon\text{-}A_xB_yC_zFe_{2-x-y-z}O_3$ (wherein A represents at least one divalent metal element selected from Co, Ni, Mn, and Zn; B represents at least one tetravalent metal element selected from Ti and Sn; and C represents at least one trivalent metal element selected from In, Ga, and Al).

The material of the type that is substituted by the C element only can be arbitrarily controlled for the coercive force of the magnetic particles, and also has an advantage that the same space group as $\varepsilon\text{-}Fe_2O_3$ can be easily obtained, but is slightly inferior in thermal stability, and therefore the material that is substituted simultaneously by the A or B element is preferred.

The material of the type that is substituted by the two elements A and B is excellent in thermal stability and can retain the high coercive force of the magnetic particles at ordinary temperature, but a single phase with the same space group as $\varepsilon\text{-}Fe_2O_3$ is slightly hardly obtained.

The material of the three-element substituted type that is substituted by the elements A, B, and C has the best balance among the aforementioned characteristics, and is excellent in heat resistance, easiness in providing a single phase, and controllability of the coercive force. In the description herein, the three-element substituted material will be described as an example.

In the three-element substituted material, the preferred ranges of the substituting amounts x, y, and z are as follows.

x and y may be in arbitrary ranges of 0<x and y<1, and are preferably x≈y since when the values of x and y are largely different from each other, a heterogeneous phase tends to be contained for balancing the electric charge. Taking the application to magnetic recording, the values are preferably in ranges of 0.01≤x and y≤0.2 since the coercive force of the three-element substituted material is necessarily changed from that of $\varepsilon\text{-}Fe_2O_3$. z may also be in a range of 0<z<1 as similar to x and y, and is preferably in a range of 0<z 0.5 from the standpoint of the control of the coercive force and the easiness in providing a single phase.

The magnetic particles obtained by substituting a part of Fe sites of the three-element substituted material obtained by the production method of the invention can have a suitable coercive force at ordinary temperature by controlling x, y, and z.

Average Particle Diameter

The magnetic particles obtained by the production method of the invention are preferably fine to such an extent that the particles each form a single magnetic domain structure. The average particle diameter thereof measured with a transmission electron microscope is preferably 30 nm or less, and more preferably 20 nm or less. However, when the average particle diameter is too small, the proportion of fine particles that do not contribute to the aforementioned enhancement of the magnetic characteristics may be increased to deteriorate the magnetic characteristics per unit weight of the magnetic particles, and thus the average particle diameter is preferably 5 nm or more, and more preferably 8 nm or more.

Solid-Liquid Separation Property

It is preferred that the iron-based oxide magnetic particle powder can be recovered by a solid-liquid separation measure that is industrially used. Specifically, the iron-based oxide magnetic particle powder preferably has such a solid-liquid separation property that the iron-based oxide magnetic particle powder can be filtered with hardened filter paper 4A (retaining particle diameter: 1 μm).

Water-Soluble Alkali Metal

The production of the iron-based oxide magnetic particle powder uses a process of neutralizing the raw material solution described later with an alkali, a process of dissolving and removing the silicon oxide coating with an alkali, and a process of neutralizing the coated substance with an alkali, and therefore the iron-based oxide magnetic particle powder contains a water-soluble alkali metal, such as Na and K, as an unavoidable impurity. The content of the water-soluble alkali metal is preferably as small as possible, and in the invention, the amount of an alkali metal that is eluted in an elution test performed after the surface modification by adhering a hydroxide or a hydrous oxide of a metal element S forming a precipitate of a hydroxide in an aqueous solution having pH of 7 or more and 12 or less is designated as the content by mass of the water-soluble alkali metal of the iron-based oxide magnetic particle powder, and the value thereof is preferably 5 ppm by mass or less. The content of the water-soluble alkali metal is preferably zero, but it is industrially difficult to attain that value.

The term "contain" herein is a concept that not only means the case where the alkali metal is present inside the iron-based magnetic particle powder, but also encompasses the alkali metal derived from the raw material solution remaining on the surface of the iron-based magnetic particle powder on drying the powder.

Tap Density

The iron-based oxide magnetic particle powder preferably has a tap density after the surface modification by adhering one kind or two kinds of Al and Y of 0.30 g/cm$^3$ or more and 1.60 g/cm$^3$ or less.

When the tap density is 1.60 g/cm$^3$ or less, the distances among the iron-based oxide magnetic particles are increased to facilitate the permeation of a liquid among the particles, and thereby the dispersibility of the particles in a coating material can be enhanced to enhance the tape orientation property.

The lower limit of the tap density is preferably 0.30 g/cm$^3$ or more, and more preferably 1.00 g/cm$^3$, in consideration of the handleability of the surface-modified iron-based oxide magnetic particle powder.

Production Method of Magnetic Particle Powder

The ε-type iron oxide-based magnetic particle powder according to the invention can be produced by any known production method including a combination of a reverse micelle method and a sol-gel method. Specifically, the known production method includes a so-called reverse micelle method, in which an organic solvent having dissolved therein an iron salt or an iron salt and a partially substituting metal salt as a starting substance is formed into micelles, and reacted with an alkaline aqueous solution as a neutralizing agent, and a method using no organic solvent, in which the starting substance is dissolved in water, and reacted with an alkaline aqueous solution as a neutralizing agent, and any production method can be used while a surfactant may be present in the reaction system in the production methods in some cases.

However, the production method using an organic solvent may provide an increased production cost, and from the industrial standpoint, the method is preferred, in which the starting substance is dissolved in water to make the total reaction system as an aqueous solution.

The detailed contents of the invention will be described below according to the procedures of the production method of the invention.

Starting Substance, Neutralizing Step, and Precursor

In the production method of the invention, as a starting substance of the iron-based oxide magnetic particle powder, an acidic aqueous solution in which a trivalent iron ion and a metal ion of a metal element that finally substitutes the Fe sites are dissolved in water or an organic solvent (which may be hereinafter referred to as a raw material solution) is used. The supply sources of the iron ion and the metal ion of the substituting element each are preferably a water-soluble inorganic salt, such as a nitrate, a sulfate, and a chloride, from the standpoint of the availability and the cost. When the metal salt is dissolved in water, the metal ion is dissociated, and the aqueous solution exhibits acidity.

When an alkaline aqueous solution is added to the acidic raw material solution containing the metal ions to neutralize to pH of 8 or more and 9 or less, a mixture of iron oxyhydroxide and a hydroxide of the substituting element or iron oxyhydroxide, a part of Fe sites of which is substituted by another metal element, is obtained. In the production method of the invention, the mixture of iron oxyhydroxide and a hydroxide of the substituting element is used as a precursor of the iron-based oxide magnetic particle powder. While not limited in the invention, the precursor used preferably contains an oxyhydroxide having a ferrihydrite structure, and particularly a ferrihydrite having a 2L structure.

The neutralization with the alkaline aqueous solution may be performed in one step or may be performed in plural divided steps. Such a method may also be employed that a hydroxycarboxylic acid is added between the divided addition steps.

The total metal ion concentration in the raw material solution is not particularly determined in the invention, and is preferably 0.01 mol/L or more and 0.5 mol/L or less. When the concentration is less than 0.01 mol/L, the amount of the iron-based oxide magnetic particle powder that is obtained by one time of the reaction may be decreased, which is economically disadvantageous. The total metal ion concentration that exceeds 0.5 mol/L is not preferred since the reaction solution tends to be gelled due to the rapid formation of the precipitate of the hydroxide.

In the production method of the invention, the temperature in the neutralization treatment is not particularly determined, and is preferably 0° C. or more and 60° C. or less. The reaction temperature that is less than 0° C. is not preferred since the reaction time may be prolonged. The temperature that exceeds 60° C. is not preferred since a heterogeneous phase (α-phase) tends to be formed finally. The reaction temperature is more preferably 10° C. or more and 40° C. or less.

The values of pH described in the description herein are measured according to JIS Z8802 with a glass electrode. The pH standard solution refers to the value that is measured with a pH meter calibrated with the suitable buffer solution corresponding to the pH range to be measured. The values of pH described in the description herein each are a measured value shown by the pH meter compensated with a temperature compensation electrode that is directly read under the reaction temperature condition.

Step of Coating Silicon Oxide

In the production method of the invention, the iron oxyhydroxide or iron oxyhydroxide containing the substituting element as the precursor formed in the preceding steps is difficult to undergo phase transition to the ε-type iron-based oxide even though the iron oxyhydroxide is subjected to a heat treatment in the status quo, and therefore iron oxyhydroxide crystals containing the substituting element are subjected to a silicon oxide coating before the heat treatment. The coating method of a silicon oxide is preferably a sol-gel method. The silicon oxide referred herein includes not only ones having the stoichiometric composition, but also ones having nonstoichiometric compositions, such as a silanol derivative described later.

In the sol-gel method, a silicon compound having a hydrolyzable group, for example, a silane compound, such as tetraethoxysilane (TEOS), tetramethoxysilane (TMOS), and various silane coupling agents, is added to the solution having the precursor dispersed therein to cause hydrolysis reaction under stirring, and a silanol derivative thus formed is coated on the surface of the iron oxyhydroxide crystals. An acid catalyst or an alkali catalyst may be added, and is preferably added in consideration of the treatment time. Representative examples thereof include hydrochloric acid for the acid catalyst, and ammonia for the alkali catalyst. In the case where the acid catalyst is used, the amount thereof is necessarily such an amount that does not dissolve the iron oxyhydroxide particles containing the substituting element. In addition, an inorganic silicon compound and sodium silicate (liquid glass) may also be used. In this case, the precursor may be once rinsed with water, then subjected to solid-liquid separation, and then again dispersed in water, to which a silane compound may be added.

The specific procedure for coating the silicon oxide may be the same as the sol-gel method in the known process. For example, the reaction temperature for the silicon oxide coating by the sol-gel method may be 20° C. or more and 60° C. or less, and the reaction time therefor may be 1 hour or more and 20 hours or less. After coating the silicon oxide, the material may be subjected to solid-liquid separation and drying, so as to provide a specimen before the heat treatment. In the solid-liquid separation herein, solid-liquid separation may be performed with an aggregating agent added.

Heat Treatment

In the production method of the invention, the iron oxyhydroxide or iron oxyhydroxide containing the substituting element as the precursor coated with the silicon oxide is heat-treated to provide the ε-type iron-based oxide. Before the heat treatment, steps of rinsing and drying may be performed. The heat treatment may be performed in an oxidizing atmosphere, and the oxidizing atmosphere may be the air atmosphere. The heating may be performed in a range approximately of 700° C. or more and 1,300° C. or less, and when the heating temperature is too high, $\alpha$-$Fe_2O_3$ as a thermodynamically stable phase (which is an impurity to ε-$Fe_2O_3$) tends to be formed, and the heat treatment is preferably performed at 900° C. or more and 1,200° C. or less, and more preferably 950° C. or more and 1,150° C. or less. The heat treatment time may be controlled to a range approximately of 0.5 hour or more and 10 hours or less, and a favorable result tends to be obtained in a range of 2 hours or more and 5 hours or less. It is considered that the presence of the silicon-containing substance covering the particles advantageously acts on the phase transition to the ε-type iron-based oxide, but not on the phase transition to the $\alpha$-type iron-based oxide. The silicon oxide coating also has a function of preventing the crystals of the iron oxyhydroxide or iron oxyhydroxide containing the substituting element from being sintered in the heat treatment.

Through the process steps described above, ε-$Fe_2O_3$ crystals are obtained in the case where the raw material solution contains only trivalent iron ion as the metal ion, and partially substituted ε-$Fe_2O_3$ crystals are obtained in the case where the raw material solution contains trivalent iron ion and the metal element for substituting Fe sites as metal ions, in the form coated with the silicon oxide. The powder obtained after the heat treatment may contain, in addition to the ε-type iron-based oxide crystals, an $\alpha$-type iron-based oxide, a $\gamma$-type iron-based oxide, and $Fe_3O_4$ crystals as impurities in some cases, and these materials are referred totally as the iron-based oxide magnetic particle powder.

Step of Removing Silicon Oxide Coating

For the purpose of a coating-type magnetic recording medium, magnetic particles coated on a tape are necessarily subjected to a magnetic field orientation treatment, and in the state where the silicon oxide is coated, the magnetization per unit area of the tape may be decreased (i.e., the signal from the tape may be decreased) due to the presence of the silicon oxide as a non-magnetic component in a large amount. Accordingly, the silicon oxide coated is removed by the step described below. As a specific method, the silicon oxide is soluble in an alkaline aqueous solution, and thus may be dissolved and removed by immersing and stirring the powder after the heat treatment in an aqueous solution containing a strong alkali, such as NaOH and KOH, dissolved therein. In the case where the dissolution rate is to be increased, the alkaline aqueous solution may be heated. As a representative example, the silicon oxide may be favorably dissolved by stirring the powder in a state, in which an alkali, such as NaOH, is added in an amount 3 times by mol or more the silicon oxide, and the temperature of the aqueous solution is 60° C. or more and 70° C. or less. The extent of the removal of the silicon oxide coating may be appropriately controlled depending on purposes.

After the removal, unnecessary ion is necessarily rinsed out with water until the electroconductivity of the filtrate reaches 50 mS/m or less for ensuring the good dispersibility in the subsequent step.

In the step of removing the silicon oxide coating in the production method of the invention, the complete removal of the silicon oxide coating may increase the cost, and therefore the silicon oxide coating may remain in such an extent that the silicon oxide coating is hidden by coating Al and Y in the subsequent step.

Dispersing Step and Adhering Step

The ε-type iron-based oxide magnetic particle powder, from which the silicon oxide coating has been removed, is insufficient in dispersibility in a coating material for forming a coating-type magnetic recording medium in the status quo, and thus the surface thereof is modified by adhering a non-magnetic hydroxide or hydrous oxide of a metal S. One of the objects of the adherence of the non-magnetic hydroxide or hydrous oxide is to suppress the ε-type iron-based oxide magnetic particle powder from being aggregated on drying. Another one of the objects is to hide the silicon oxide coating partially remaining on the surface of the ε-type iron-based oxide magnetic particle powder after the silicon oxide coating removal treatment, so as to enhance the dispersibility of the iron-based oxide magnetic powder in a coating material.

While the adhering method of the substances performed may be a dry method, the invention employs a wet method excellent in productivity.

In the production method of the invention, the ε-type iron-based oxide magnetic particle powder, from which the silicon oxide coating has been removed, is dispersed in an aqueous solution, which is subjected to strong stirring. The strong stirring herein means, for example in the case using a 5 L beaker, a state of stirring with turbine blades or the like at a rotation number of 300 rpm or more. The purpose of the strong stirring is to perform the adhering treatment in the state where the ε-type iron-based oxide magnetic particle powder is well dispersed. The aqueous solution, in which the ε-type iron-based oxide magnetic particle powder is dispersed, preferably has pH controlled to 9 or more and 12 or less, within which the dispersibility of the magnetic particle powder becomes the most preferred.

Subsequently, an ion of the metal S forming a hydroxide precipitate in a pH range of 7 or more and 12 or less is added to the aqueous solution having the ε-type iron-based oxide magnetic particle powder dispersed under strong stirring, so as to adhere the hydroxide to the surface of the ε-type iron-based oxide magnetic particle powder as seed crystals. The metal ion forming a hydroxide precipitate in a pH range of 7 or more and 12 or less does not mean that a hydroxide precipitate is formed only in this pH range, but may be one forming a hydroxide precipitate in a wider pH range. The hydroxide is a concept that includes a partially dehydrated hydrous oxide. In the case where the addition of the ion of the metal S decreases the pH to less than 7, an alkali may be added thereafter for controlling the pH. The metal S suffices to be one forming a hydroxide precipitate formed in the pH range, which is non-magnetic, and is preferably one kind or two kinds of Al and Y from the standpoint of the availability and the cost.

The amount of one kind or two kinds of Al and Y adhered in terms of molar ratio S/M is preferably 0.02 or more and 0.10 or less, in which S represents the amount thereof adhered and M represents the total amount of Fe and the substituting metal element contained in the iron-based oxide magnetic particle powder. The molar ratio S/M that is less than 0.02 is not preferred since only a part of the surface of the iron-based oxide magnetic particle powder can be coated. The molar ratio S/M that exceeds 0.10 is not preferred since the volume proportion of the non-magnetic component becomes too large.

While not limiting in the invention, the surface-modified iron-based oxide magnetic particle powder is separated by a known solid-liquid separation measure, rinsed with water, and then dried. The solid-liquid separation, the water rinsing, and the drying may be performed, for example, in such a manner that the powder is subjected to solid-liquid separation and water rinsing with a filter press, and then dried with a shelf dryer or the like, and such a method may be employed that the electroconductivity of the slurry containing the surface-modified iron-based oxide magnetic particle powder is decreased by rinsing with an ultrafiltration membrane or the like, and then the powder is dried by using a drying equipment represented by a spray dryer. The hydroxide may be partially dehydrated by drying to become a hydrous oxide.

In the surface-modified iron-based oxide magnetic particle powder thus obtained, even though a certain amount of the silicon oxide remains on the surface before adhering the hydroxide of the metal S, the hydroxide or the hydrous oxide of the metal S is adhered thereover, and thus, even on drying, the aggregation due to the silicon oxide is prevented to provide magnetic particle powder having a small tap density with good dispersibility.

Observation with Transmission Electron Microscope (TEM)

The observation of the surface-modified iron-based oxide magnetic particle powder obtained by the production method of the invention with a TEM is performed under the following condition.

The TEM used for observation is JEM-1011, produced by JEOL, Ltd. For the observation of particles, TEM micrographs are taken at a magnification of 100,000, and enlarged by 3 times at the time of developing, and the resulting TEM micrographs are used (using the particles after removing the silicon oxide coating).

The average particle diameter is evaluated by digitizing, in which the distance between two points in one particle that are most remote from each other is measured. The number of particles measured is 300 or more.

Compositional Analysis

The compositional analysis is performed with ICP-720ES, produced by Agilent Technologies, Inc. The measurement wavelengths (nm) are Fe: 259.940 nm, Ga: 294.363 nm, Co: 230.786 nm, Ti: 336.122 nm, Al: 396.152 nm, and Y: 361.104 nm.

Evaluation Method of Water-soluble Component 50 mL of ultrapure water is placed in a 50 mL centrifuge tube, to which 5 g of the surface-modified iron-based oxide magnetic particle powder as a specimen is added. The mixture is shaken at a liquid temperature of 25° C. for 10 minutes and then subjected to centrifugal separation for 20 minutes to separate a supernatant and a precipitate. The resulting supernatant is collected and then measured for the concentration of the water-soluble component, such as Na and K, by the atomic absorption spectrometry with ZA3300, produced by Hitachi High-Tech Science Corporation, and the eluted amount is calculated. The value of the eluted amount is divided by the mass of the specimen, so as to calculate the content by mass of the water-soluble component contained in the iron-based oxide magnetic particle powder.

Measurement of Tap Density

The tap density is measured according to the method described in Example 1 of JP-A-2007-263860.

Measurement of Magnetic Hysteresis Curve (Bulk B-H Curve)

The surface-modified iron-based oxide magnetic particle powder is placed in a plastic container having a diameter of 416 mm, and measured for the coercive force Hc (Oe, kA/m), the saturation magnetization as ($Am^2$/kg), and the squareness ratio SQ, at an external magnetic field of 795.8 kA/m (10 kOe) with a VSM machine (VSM-P7), produced by Toei Industry Co., Ltd.

Preparation of Magnetic Coating Material 0.31 g of a specimen powder (surface-modified iron-based oxide magnetic particle powder) is weighed and placed in a stainless steel pot (inner diameter: 45 mm, depth: 13 mm), which is allowed to be in a state where the lid thereof is opened for 10 minutes. A vehicle (obtained by dissolving 34.9 g of a urethane resin (UR-8200, produced by Toyobo Co., Ltd.) and 15.8 g of a vinyl chloride resin (MR-555, produced by Nippon Zeon Corporation) in a mixed solvent of 0.25 g of acetylacetone, 0.25 g of n-butyl stearate, and 97.9 mL of cyclohexane) is collected in an amount of 1.11 mL with a micropipette and added to the pot. Immediately thereafter, 30 g of steel balls (diameter: 2 mm) and 10 pieces of nylon balls (diameter: 8 mm) are added to the pot, and after closing the lid, the pot is allowed to stand for 10 minutes. Thereafter, the pot is mounted on a centrifugal ball mill (Fritsch P-6), the rotation number of which is gradually increased to 600 rpm, and a dispersion treatment is performed for 10 minutes or 60 minutes. After the centrifugal ball mill is stopped, the pot is taken out therefrom, to which 0.70 mL of a conditioning liquid, which is a mixture of MEK and toluene having been mixed in advance at a ratio of 1/1, is added thereto with a micropipette. The pot is again mounted on the centrifugal ball mill, and subjected to a dispersion treatment at 600 rpm for 5 minutes, so as to prepare a coating material.

Formation of Magnetic Sheet

After completing the dispersion shown above, the lid of the pot is opened, the nylon balls are removed, and the coating material thus prepared is placed in an applicator (distance: 250 μm) along with the steel balls, and coated on a supporting film (a polyethylene film, Lumirror, a trade name, produced by Toray Industries, Inc.). Immediately after coating, the coated film is subjected to magnetic field orientation by quickly placing at the center of the coil of the orientation device with a magnetic flux density of 0.55 T, and then dried by allowing to stand.

Measurement of Magnetic Hysteresis Curve (Sheet B-H Curve)

A plastic plate is adhered to the film for enabling the discrimination of the magnetic field orientation direction thereof, and the assembly is cut with a punch or the like to form a measurement piece having a 10 mm square, which is mounted with the orientation direction aligned with the direction of the applied magnetic field, and measured for the saturation magnetic flux density Bs (Gauss) and the residual magnetic flux density Br (Gauss) at an external magnetic field of 795.0 kA/m (10 kOe) with a VSM machine (VSM-P7), produced by Toei Industry Co., Ltd., and SQx (=Br/Bs) in the orientation direction of the magnetic field is obtained.

In the production method of the invention, it is determined that the effect of the adherence is found in the case where SQx is increased by 0.01 or more.

EXAMPLES

Example 1

As starting substances of Fe, Ga, Co, and Ti, 3,296.53 g of iron(III) nitrate nonahydrate, 854.72 g of a Ga(III) nitrate aqueous solution having a Ga concentration of 10.70 mass %, 74.27 g of cobalt(II) nitrate hexahydrate, and 77.96 g of titanium(IV) n-hydrate having a Ti concentration of 15.2 mass were used respectively, to which 20.31 kg of pure water was added to prepare a mixed aqueous solution. 2.78 kg of a 22.35 mass % ammonia solution was added to the raw material solution at a liquid temperature of 30° C. under mechanically stirring to neutralize the solution, and then the solution was continuously stirred for 0.5 hour to prepare a slurry having the precursor dispersed therein (Procedure 1).

To the slurry obtained in Procedure 1, 5.65 kg of 97.1 mass % tetraethoxysilane was added dropwise over 35 minutes under mechanically stirring, and the mixture was continuously stirred at 30° C. for 20 hours in the air, thereby providing a slurry containing the precursor coated with a silanol derivative formed through hydrolysis. The slurry was rinsed and subjected to solid-liquid separation, so as to recover the precursor coated with the silanol derivative as a cake (Procedure 2).

After drying the cake obtained in Procedure 2, the dried powder thereof was subjected to a heat treatment in a furnace with an air atmosphere at 1,068° C. for 4 hours, so as to provide iron-based oxide magnetic particle powder coated with a silicon oxide, which was then stirred in a 20 mass % NaOH aqueous solution at approximately 60° C. for 24 hours to remove the silicon oxide on the surface of the particles, and rinsed with an ultrafiltration membrane until the electroconductivity reached 5 mS/m or less, thereby providing a slurry containing ε-type iron-based oxide magnetic powder, a part of Fe sites of which was substituted by Ga, Co, and Ti (Procedure 3).

To 2,802 g of the slurry containing 1.37 mass % of the iron-based oxide magnetic particle powder obtained in Procedure 3, a NaOH aqueous solution was added under mechanically stirring at a rotation number of 391 rpm at a liquid temperature 40° C. to control pH 11.7, then a 1.72 mass % aluminum sulfate aqueous solution was added, and then a NaOH aqueous solution was added dropwise until pH 8.5, followed by continuously stirring for 10 minutes, so as to adhere a hydroxide of Al to the iron-based oxide magnetic particle powder. Subsequently, the slurry was rinsed until the electroconductivity reached 1 mS/m or less, filtered with hardened filter paper 4A, and then dried, thereby providing surface-modified iron-based oxide magnetic particle powder (Procedure 4).

The surface-modified iron-based oxide magnetic particle powder obtained in Procedure 4 was subjected to the chemical analysis of the composition, the TEM observation, the measurement of the magnetic characteristics, and the like, and a magnetic tape was produced therewith according to the "Formation of Magnetic Sheet" shown above and measured for the magnetic characteristics of the magnetic tape according to the "Measurement of Magnetic Hysteresis Curve (Sheet B-H Curve)" shown above. In the production of the tape, the dispersion time was 10 minutes, and the composition was dried in a magnetic field with an orientation magnetic field of 5.5 kOe (438 kA/m).

The properties of the resulting surface-modified iron-based oxide magnetic particle powder, the bulk magnetic characteristics thereof, and the magnetic characteristics of the tape are shown in Table 1.

It is found that the surface-modified iron-based oxide magnetic particle powder having Al adhered thereto obtained in this example has a TEM average particle diameter that is the same as that of the iron-based oxide magnetic particle powder having no Al adhered thereto of Comparative Example 1 described later, but the tap density thereof is decreased due to the adherence of Al. It is estimated that this is because the silicon oxide remaining in a slight amount on the surface of the iron-based oxide magnetic particle powder is hidden to prevent the iron-based oxide magnetic particle powder from being aggregated. As a result, it is considered that the tape produced with the surface-modified iron-based oxide magnetic particle powder in the form of a coating material has an enhanced SQx.

Example 2

Surface-modified iron-based oxide magnetic particle powder having Y adhered thereto was obtained in the same procedures as in Example 1 except that a 2.13 mass % yttrium sulfate aqueous solution was used as the aqueous solution containing the element to be adhered.

The properties of the resulting surface-modified iron-based oxide magnetic particle powder, the bulk magnetic characteristics thereof, and the magnetic characteristics of the tape are shown in Table 1.

In this example, the tap density is decreased due to the adherence of Y, and the SQx is increased, as similar to Example 1.

Comparative Example 1

The same procedures as until Procedure 3 of Example 1 were performed, and then the slurry was filtered with hardened filter paper 4A (retaining particle diameter: 1 μm), but the iron-based oxide magnetic particles as a solid content were passed through the filter paper, and solid-liquid separation was not able to be performed by filtration. By using Omnipore membrane filter (model No.: JGWP09025, pore diameter: 0.2 μm) as filter paper, the same result was obtained, and solid-liquid separation was not able to be performed. The slurry was then subjected to solid-liquid separation and drying by entirely evaporating the water content with a dryer, thereby providing iron-based oxide magnetic particle powder. The properties of the resulting surface-modified iron-based oxide magnetic particle powder obtained in Comparative Example 1, the bulk magnetic characteristics thereof, and the magnetic characteristics of the tape are shown in Table 1. This comparative example provides such results that the tap density is large, and the SQx is low since the silicon oxide remaining on the surface of the particles on drying acts to aggregate the particles.

Example 3

In a reaction tank, 4,659.28 g of iron(III) nitrate nonahydrate having a purity of 99.7%, 1,421.39 g of a Ga (III) nitrate aqueous solution having a Ga concentration of 12.9%, 157.83 g of cobalt (II) nitrate hexahydrate having a purity of 97%, and 119.13 g of titanium(IV) n-hydrate having a Ti concentration of 15.1% were dissolved in 23.64 g of pure water in an air atmosphere under a condition of 40° C. under mechanically stirring with a stirring blade. The charged solution had a molar ratio of metal ions of Fe/Ga/Co/Ti=1.530/0.350/0.070/0.050. The numbers in parentheses following the reagent names are the valencies of the metal elements.

Under mechanically stirring with a stirring blade in the air atmosphere at 40° C., 2,698.88 g of a 23.31% ammonia solution was added thereto at one time, and the mixture was stirred for 2 hours.

2,887.51 g of a citric acid solution having a citric acid concentration of 20 mass % was then continuously added thereto under a condition of 40° C. over 1 hour, then 1,470.86 g of a 23.31% ammonia solution was added thereto at one time, and the mixture was retained under a condition of a temperature of 40° C. under stirring for 1 hour, thereby forming crystals of iron oxyhydroxide containing the substituting element, which was a precursor as an intermediate (Procedure 1).

Thereafter, in an air atmosphere at 40° C., to the precursor slurry obtained in Procedure 1 under stirring, tetraethoxysilane in an amount of approximately 700% by weight based on ε-$Fe_2O_3$c was added, and 8,553.94 g of tetraethoxysilane was added to the slurry liquid over 35 minutes. The mixture was further stirred for approximately 1 day, so as to coat with a silanol derivative formed through hydrolysis. Thereafter, the resulting solution was subjected to rinsing and solid-liquid separation, so as to recover as a cake (Procedure 2).

After drying the cake obtained in Procedure 2, the dried powder thereof was subjected to a heat treatment in a furnace with an air atmosphere at from 1,040° C. to 1,050° C. for 4 hours, so as to provide iron-based oxide magnetic particle powder coated with a silicon oxide, which was then stirred in a 20 mass % NaOH aqueous solution at approximately 60° C. for 24 hours to remove the silicon oxide on the surface of the particles, and rinsed with an ultrafiltration membrane until the electroconductivity reached 5 mS/m or less, thereby providing a slurry containing ε-type iron-based oxide magnetic powder, a part of Fe sites of which was substituted by Ga, Co, and Ti (Procedure 3).

To 4,000 g of the slurry containing 1.50 mass % of the iron-based oxide magnetic particle powder obtained in Procedure 3, a NaOH aqueous solution was added under mechanically stirring at a rotation number of 391 rpm at a liquid temperature 40° C. to control pH 11.9, then 19.07 g of a 1.77 mass % aluminum sulfate aqueous solution and 55.14 g of a 1.98 mass % yttrium sulfate solution were added, and then a NaOH aqueous solution was added dropwise until pH 8.5, followed by continuously stirring for 10 minutes, so as to adhere a hydroxide of Al and Y to the iron-based oxide magnetic particle powder. Subsequently, the slurry was rinsed until the electroconductivity reached 1 mS/m or less, filtered with hardened filter paper 4A, and then dried, thereby providing surface-modified iron-based oxide magnetic particle powder (Procedure 4).

The surface-modified iron-based oxide magnetic particle powder obtained in Procedure 4 was subjected to the chemical analysis of the composition, the TEM observation, the measurement of the magnetic characteristics, and the like, and a magnetic coating material was prepared according to "Preparation of Magnetic Coating Material" shown above, and a magnetic tape was produced therewith according to the "Formation of Magnetic Sheet" shown above, except that in the production of the tape, the dispersion time was 60 minutes, and the coating material was dried in a magnetic field with an orientation magnetic field of 5.5 kOe (438 kA/m). The tape was measured for the magnetic characteristics of the magnetic tape according to the "Measurement of Magnetic Hysteresis Curve (Sheet B-H Curve)" shown above. It is found that the surface-modified iron-based oxide magnetic particle powder having Al and Y adhered thereto obtained in this example has a TEM average particle diameter that is the same as that of the iron-based oxide magnetic particle powder having no Al or Y adhered thereto of Comparative Example 2 described later, but the tap density thereof is decreased due to the adherence of Al and Y. It is estimated that this is because the silicon oxide remaining in a slight amount on the surface of the iron-based oxide magnetic particle powder is hidden to prevent the iron-based oxide magnetic particle powder from being aggregated. As a result, it is considered that the tape produced with the surface-modified iron-based oxide magnetic particle powder in the form of a coating material has an enhanced SQx as compared to Comparative Example 2.

Comparative Example 2

The same procedures as until Procedure 3 of Example 3 were performed except that the iron-based oxide magnetic particle powder was rinsed with an ultrafiltration membrane until the electroconductivity reached 1 mS/m or less, thereby providing a slurry containing ε-type iron-based oxide magnetic powder, a part of Fe sites of which was substituted by Ga, Co, and Ti. The slurry was then filtered with hardened filter paper 4A (retaining particle diameter: 1 μm), but the iron-based oxide magnetic particles as a solid content were passed through the filter paper, and solid-liquid separation was not able to be performed by filtration. By using Omnipore membrane filter (model No.: JGWP09025, pore diameter: 0.2 μm) as filter paper, the same result was obtained, and solid-liquid separation was not able to be performed. The slurry was then subjected to solid-liquid separation and drying by entirely evaporating the water content with a dryer, thereby providing iron-based oxide magnetic particle powder. The properties of the resulting surface-modified iron-based oxide magnetic particle powder obtained in Comparative Example 2, the bulk magnetic characteristics thereof, and the magnetic characteristics of the tape are shown in the table. This comparative example provides such results that the tap density is large, and the SQx is low since the silicon oxide remaining on the surface of the particles on drying acts to aggregate the particles.

Filtration Characteristics

As described above, for the slurries containing the iron-based oxide magnetic particle powder having no hydroxide adhered thereto of Comparative Examples, the iron-based oxide magnetic particles as a solid content were passed through the hardened filter paper 4A (retaining particle diameter: 1 μm) and Omnipore membrane filter (model No.: JGWP09025, pore diameter: 0.2 μm), and solid-liquid separation was not able to be performed by filtration. Accordingly, the slurry was subjected to solid-liquid separation and drying by entirely evaporating the water content with a dryer.

In Examples, on the other hand, for the slurries containing the iron-based oxide magnetic particle powder having one kind or two kinds of Al and Y adhered thereto, the iron-based oxide magnetic particle powder was able to be recovered with the hardened filter paper 4A (retaining particle diameter: 1 μm).

In the slurry containing the iron-based oxide magnetic particle powder having the hydroxide adhered thereto according to the invention, it is considered that the aggregation property of the particles in an aqueous medium is enhanced by adhering the hydroxide on the surface of the particles, and thus can be subjected to solid-liquid separation by filtration.

As described herein, the iron-based oxide magnetic particle powder that has a hydroxide adhered thereto can be subjected to solid-liquid separation by filtration, so as to save the energy required for solid-liquid separation and drying, and thus is preferred in industrial production.

Dispersibility in Coating Material

It is considered that the aggregation property of the particles in an aqueous medium is enhanced by adhering the hydroxide on the surface of the particles, but the magnetic tapes produced with the surface-modified iron-based oxide magnetic particle powder in the form of a coating material obtained in the invention showed excellent magnetic characteristics. It is considered that this is because the problem of aggregation of the particles does not occur in the medium of an organic solvent used for forming the coating material, and thus the dispersibility thereof in the coating material is rather improved.

Water-Soluble Alkali Metal

By the solid-liquid separation that can be performed by filtration, the impurities, such as an alkali metal, contained in a slight amount in the liquid of the slurry containing the iron-based oxide magnetic particle powder having a hydroxide adhered thereto can be removed.

Comparative Examples provided such results that the water-soluble Na amounts eluted from the obtained iron-based oxide magnetic particle powder were as high as 92 ppm and 10 ppm as shown in Table 1. In Comparative Example 2, in particular, the iron-based oxide magnetic particle powder was obtained by drying the slurry after rinsing the slurry with an ultrafiltration membrane until the electroconductivity reached 1 mS/m or less, which was the same as Examples where the electroconductivity was lowered to 1 mS/m or less, but there were such results that the iron-based oxide magnetic particle powder had a large water-soluble Na amount.

It is considered that this is because in Comparative Examples, the solid-liquid separation and drying are performed by subjecting the slurry containing the iron-based oxide magnetic particle powder to a dryer since the solid-liquid separation cannot be performed by filtration, and thus Na contained in a slight amount in the liquid is not removed, but is concentrated and remains on the surface of the particles.

Furthermore, as the factor of the large water-soluble Na amount in Comparative Examples described above, it is also considered that the Na component adhered to the surface of the particles of the iron-based oxide magnetic particle powder is not removed by the rinsing by ultrafiltration performed in Procedure 3, but remains on the surface of the particles.

On the other hand, Examples 1 to 3 provided such results that the water-soluble Na amount of the resulting surface-modified iron-based oxide magnetic particle powder was as low as 3 ppm or less as shown in the table. It is considered that this is because, for example, the impurities contained in a slight amount in the liquid can be removed by performing solid-liquid separation by filtration, such a state is provided that the Na component amount on the surface of the particles is decreased by adhering a hydroxide of the metal S to the surface of the iron-based oxide magnetic particle powder, and further the surface is modified by the adhered material into such a state that prevents the Na component from remaining, resulting in effective removal of the Na component on the surface of the surface-modified iron-based oxide magnetic particle powder by ultrafiltration, and consequently it is considered that the elution amount of the water-soluble Na amount is decreased.

Due to the small eluted Na amount, the surface-modified iron-based oxide magnetic particle powder of the invention can decrease the formation amount of the fatty acid Na precipitate formed on the surface of the coating-type magnetic recording medium, and thus is favorably applied to the purpose of a coating-type magnetic recording medium.

While Na hydroxide is used as the alkali hydroxide in the production process in Examples of the invention, the same results may be obtained by using other alkali hydroxides, such as K hydroxide and Ca hydroxide.

TABLE 1

| | Adhering step Adhered element S | Ultrafiltration Electro-conductivity (mS/m) | Solid-liquid separation | Properties of powder | | | |
|---|---|---|---|---|---|---|---|
| | | | | TEM average particle diameter (nm) | BET specific surface area ($m^2/g$) | TAP density ($g/cm^3$) | Water-soluble Na (ppm) |
| Example 1 | Al | 1 | filtered with hardened filter paper 4A | 16.4 | 71 | 1.51 | 3 |
| Example 2 | Y | 1 | filtered with hardened filter paper 4A | 16.4 | 66 | 1.30 | 2 |
| Comparative Example 1 | none | 5 | drying slurry | 16.4 | 73 | 1.84 | 92 |
| Example 3 | Al and Y | 1 | filtered with hardened filter paper 4A | 17.2 | 66 | 1.44 | <1 |
| Comparative Example 2 | none | 1 | drying slurry | 17.2 | 73 | 1.77 | 10 |

TABLE 1-continued

|  | Compositional ratio | | | | Adhered amount of S (S/M) | Bulk magnetic characteristics (VSM 10 kOe) | | | | Tape characteristics |
|---|---|---|---|---|---|---|---|---|---|---|
|  | Fe | Ga | Co | Ti |  | Hc (Oe) | Hc (kA/m) | σs (Am$^2$/kg) | SQ | SQx |
| Example 1 | 1.64 | 0.241 | 0.051 | 0.064 | 0.030 | 3352 | 267 | 14.9 | 0.53 | 0.67 |
| Example 2 | 1.65 | 0.241 | 0.050 | 0.064 | 0.032 | 3384 | 269 | 14.4 | 0.53 | 0.66 |
| Comparative Example 1 | 1.64 | 0.242 | 0.051 | 0.064 | — | 3376 | 269 | 15.2 | 0.53 | 0.65 |
| Example 3 | 1.56 | 0.343 | 0.043 | 0.053 | 0.034 | 2661 | 212 | 15.2 | 0.52 | 0.62 |
| Comparative Example 2 | 1.56 | 0.333 | 0.048 | 0.057 |  | 2718 | 216 | 15.8 | 0.53 | 0.60 |

The invention claimed is:

1. A surface-modified iron-based oxide magnetic particle powder comprising iron-based oxide magnetic particle powder containing ε-Fe$_2$O$_3$ or ε-Fe$_2$O$_3$, a part of Fe sites of which is substituted by another metal element, having an average particle diameter measured with a transmission electron microscope of 5 nm or more and 30 nm or less, having adhered to a surface thereof a hydroxide or a hydrous oxide of at least one of Al and Y forming a precipitate of a hydroxide in an aqueous solution having pH of 7 or more and 12 or less, and wherein the surface-modified iron-based oxide magnetic particle powder has a tap density of 0.30 g/cm$^3$ or more and 1.60 g/cm$^3$ or less.

2. The surface-modified iron-based oxide magnetic particle powder according to claim 1, wherein the surface-modified iron-based oxide magnetic particle powder has a molar ratio of the at least one of Y and Al/M of 0.02 or more and 0.10 or less, wherein M represents a sum of Fe and the substituting metal element contained therein.

3. The surface-modified iron-based oxide magnetic particle powder according to claim 1, wherein the iron-based oxide is ε-A$_x$B$_y$C$_z$Fe$_{2-x-y-z}$O$_3$ (wherein A represents at least one divalent metal element selected from Co, Ni, Mn, and Zn; B represents at least one tetravalent metal element selected from Ti and Sn; C represents at least one trivalent metal element selected from In, Ga, and Al; and $0<x<1$, $0<y<1$, and $0<z<1$).

* * * * *